United States Patent
Takeda

(10) Patent No.: US 7,899,932 B2
(45) Date of Patent: Mar. 1, 2011

(54) RELAYED NETWORK ADDRESS TRANSLATOR (NAT) TRAVERSAL

(75) Inventor: Yutaka Takeda, San Diego, CA (US)

(73) Assignee: Panasonic Corporation, Osaka (JP)

( * ) Notice: Subject to any disclaimer, the term of this patent is extended or adjusted under 35 U.S.C. 154(b) by 1510 days.

(21) Appl. No.: 10/342,304

(22) Filed: Jan. 15, 2003

(65) Prior Publication Data

US 2004/0139227 A1 Jul. 15, 2004

(51) Int. Cl.
*G06F 15/16* (2006.01)
*G06F 12/00* (2006.01)

(52) U.S. Cl. ...................................... 709/245; 709/230
(58) Field of Classification Search ................. 709/231, 709/243, 203, 230, 245–250
See application file for complete search history.

(56) References Cited

U.S. PATENT DOCUMENTS

| | | | |
|---|---|---|---|
| 6,393,488 B1 * | 5/2002 | Araujo | 709/245 |
| 6,822,957 B1 * | 11/2004 | Schuster et al. | 370/389 |
| 7,328,280 B2 * | 2/2008 | Takeda et al. | 709/245 |
| 2002/0083342 A1 | 6/2002 | Webb et al. | |
| 2002/0138596 A1 * | 9/2002 | Darwin et al. | 709/220 |
| 2002/0147810 A1 | 10/2002 | Traversat et al. | |
| 2002/0157090 A1 * | 10/2002 | Anton, Jr. | 717/178 |
| 2004/0057385 A1 * | 3/2004 | Roshko | 370/252 |
| 2004/0064584 A1 * | 4/2004 | Mitchell et al. | 709/245 |

FOREIGN PATENT DOCUMENTS

WO        WO 02/073921 A2        9/2002

OTHER PUBLICATIONS

IBM. YouServ: A web-hosting and content sharing tool for the masses. WWW 2002, May 7-11, 2002. ACM 1-58113-449— May 2, 0005.*
J. Rosenberg, et al., "Traversal Using Relay NAT (TURN)", draft-rosenberg-midcom-turn-00.txt, IETF MIDCOM WG, Nov. 14, 2001.
J. Rosenberg, et al., "STUN—Simple Traversal of UDP Through NAT", draft-ietf-midcom-stun-02.txt, IETF MIDCOM WG, Aug. 22, 2002.
P. Cordell, "SPAN-A—Candidate A for the Pre-Midcom SPAN Protocol", draft-cordell-midcom-span-a-00.txt, IETF MIDCOM WG, Jun. 24, 2002.
J. Rosenberg, et al., "NAT and Firewall Scenarios and Solutions for SIP", draft-ietf-sipping-nat-scenarios-00.txt, IETF SIPPING WG, Jun. 24, 2002.

(Continued)

*Primary Examiner*—Zarni Maung
(74) *Attorney, Agent, or Firm*—Harness, Dickey & Pierce, P.L.C.

(57) ABSTRACT

Network Address Translator (NAT) traversal is performed for a host located behind the NAT running a server, e.g., an HTTP server, using a relay server and a redirect server. The host (of the HTTP server) located behind the NAT uses a NAT-discovery process to determine the presence of the interposed NAT. Seamless IP communication over the IP network is provided using a Dynamic DNS (DDNS) system that is updated using a user registration database, which contains information about the presence or absence of a NAT relative to the HTTP server.

19 Claims, 2 Drawing Sheets

OTHER PUBLICATIONS

Handley & Jacobson, "SDP: Session Description Protocol", RFC 2327, IETF Network Working Group, Apr. 1998.
International Search Report for PCT/CA 02/00318; Mailed: Feb. 12, 2003; ISA/EPO.
International Search Report for PCT/JP2004/000259; Mailed: Oct. 7, 2004; ISA/EPO.
"The Gnutella Protocol Specification v0.4[1], Document Revision 1.2", Clip2 http://www.clip2.com, protocols@clip2.com, 10 pages.

* cited by examiner

RELAYED NETWORK ADDRESS TRANSLATOR (NAT) TRAVERSAL

BACKGROUND OF THE INVENTION

In the last decade, the number of computers connected to the Internet has increased by an enormous order of magnitude. High growth in the number of Internet connections has put severe pressure on the available address-space of routable internet protocol (IP) addresses. To overcome the problem of limited and diminishing IP address-space, it became imperative to have a solution that would allow multiple users to share a single routable internet address. The commonly used solution for sharing a single IP address is known as a Network Address Translator (NAT). Operation of a typical NAT is described next.

The basic concept underlying a NAT is to have a device or software module that allows sharing of one or more routable Internet Protocol (IP) addresses by multiple computers. A typical NAT is connected to the public internet on one side and has at least one global or public IP address for receiving and sending data packets from and to the public internet. On the other side of the typical NAT is a private network, in which each network node (computer) is assigned a local arbitrary addresses. Typically, the NAT assigns arbitrary addresses to the nodes of the private network using a Dynamic host Control Protocol (DHCP) or alternatively the NAT assigns static translation addresses.

The NAT provides a convenient way of providing shared and transparent communication between the public internet and the computers (attached to a private network) having a non-globally-unique IP address, i.e., an IP address that is not globally-unique. However, not all forms of communications are operable over NAT. Many types of applications require a globally-unique IP address as a termination point or require IP address consistency over the whole communication cycle. For example, an IP enabled phone will typically require a globally-unique IP address to receive and send voice-transmission using the IP. Presence of a NAT at the receiving end of the IP phone call may block the receiver from receiving the phone IP packets.

The presence of NATs in a network poses another type of problem as described next. There is no simple and convenient way to access a server type of device located behind a NAT from the public internet side of the NAT. For example, if a Hypertext Transfer Protocol (HTTP) webserver is located behind a NAT, then it has a private address which is invisible to the outside world through the public internet. On the contrary, a typical webserver, e.g., an HTTP server, which is not behind a NAT is readily accessible from the public internet if it has an IP address that can be resolved using common methods like the Domain Name System (DNS).

Typically, an HTTP server on a host is assumed to use the default port number, namely 80, for a host. An advantage of this arrangement is that the user of the browser does not need to designate a port number in addition to the address of the host because the default port number will be assumed. Because of the prevalence of Domain Name System (DNS) servers and dynamic DNS (DDNS) servers, most users of browsers do not understand that a domain name, e.g., www.name.com, represents a universal resource locator (URL), which is a long string of numbers. Moreover, most users of browsers have no understanding that a domain name of an HTTP server maps to a port number of the host as well as an address of the host because most users have never had to provide a port number.

TCP/IP allows multiple applications to run on a single computer using a variety of port numbers. When a NAT is used by a private network to share an IP address, then the port addresses are shielded behind the NAT from the outside network. This situation can be further complicated by presence of a firewall with a security policy that does not allow access to specific ports of the computers on the private network as described next.

A port-forwarding solution creates a "tunnel" through the firewall so that that external users from the public internet can access a specific computer in the private network using the designated port for the tunnel. Typically, a port forwarding solution has a maximum number of about five forwarded port entries. But many applications like network-gaming, instant messaging and collaboration software may require access to previously "unopened" specific TCP/UDP ports from the external public internet. Creating all the required tunnels for such applications can be an impractical task for a typical user, since the tunnel configuration process can be complicated and confusing. Port forwarding is typically a kind of functionality provided by a router, hence it typically raises a need for a specific router that has an inbuilt port forwarding capability.

The presence of NAT may not affect the network much if the transport connections are initiated from the clients that are behind the NAT. But if a server is located behind a NAT, then IP requests originating from the public network may not be able to access the server due to the presence of NAT. An approach to solve this problem, and its drawbacks are discussed next. In a Dynamic Domain Name System (DDNS) the users attempting to access a server located behind a NAT using a Fully Qualified Domain Name (FQDN) may face problems. Such problems result from the situation when a server or device behind a NAT is assigned a private IP address by a NAT which is invisible. A DDNS trying to route packets to an IP address due to a FQDN access request will fail since the NAT-assigned private address is invisible to the public internet side of the NAT.

One approach to get around the NAT restrictions is called DMZ (an acronym for De-Militarized Zone) which allows a given machine behind a NAT to be directly connected to the internet, without compromising security of other machines in the network. DMZ allows a machine behind the NAT to operate as if it is directly connected to the internet. DMZ, like port forwarding discussed above, can be confusing to configure for a typical user, since it requires user expertise to configure it. Those skilled in the art will appreciate that DMZ cannot be used to open-up all machines of a network to the public internet. DMZ exposes a given machine to all the vulnerabilities that are associated with a direct connection to the internet, since it overrides the firewall protection. Hence, neither DMZ nor port forwarding is a satisfactory solution to the problem of transparent NAT traversal that requires no or minimum user effort to implement.

Universal Plug-and-Play (UPnP) is another method for NAT traversal. UPnP can provide the public IP address to the client behind the NAT. Like port forwarding, UPnP facilities are typically provided by the router itself. But the drawback of this approach lies in the special hardware requirement in the form of a router that is UPnP compliant.

Attempts have been made to define protocols for solving the NAT traversal problem described above. For example, protocols like TURN (Traversal Using Relay NAT), STUN (Simple Traversal of UDP through NAT), SPAN-A (Simple Protocol for Augmenting NATs), etc., provide an approach that does not require routers to have specific functionality of supporting NAT traversal. However, the above protocols have their own drawbacks. STUN can detect the presence of a NAT and the type of NAT. However, the STUN protocol by itself does not allow applications using HTTP protocol to overcome NAT traversal issues. TURN or SPAN-A protocols allocate a TCP listener on the relay server to relay incoming packets from one point to another, but do not address the problem of how an application can operate using NAT traversal.

SUMMARY OF THE INVENTION

A host running an HTTP server behind a Network Address Translator (NAT) connected to an IP network uses a NAT-discovery process, e.g., a STUN test, to determine the presence of the NAT. The host updates information in a redirect server based on the response of a relay server. An HTTP client host initiates a DNS query which connects it to the redirect server. The HTTP client host sends an HTTP request to the redirect server, which in turn redirects the HTTP request to a port on the packet relay server. The packet relay server relays the HTTP request to the HTTP server behind the NAT, which generates an HTTP response that is relayed back to the HTTP client. Seamless communication in a IP network is made possible by using a DDNS server that is updated using a user registration database. The IP network may have hosts located behind NATs and hosts that are directly connected to the IP network.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXAMPLE EMBODIMENTS

The following description of the example embodiment(s) is merely exemplary in nature and is in no way intended to limit the invention, its application, or uses.

Figure 1:
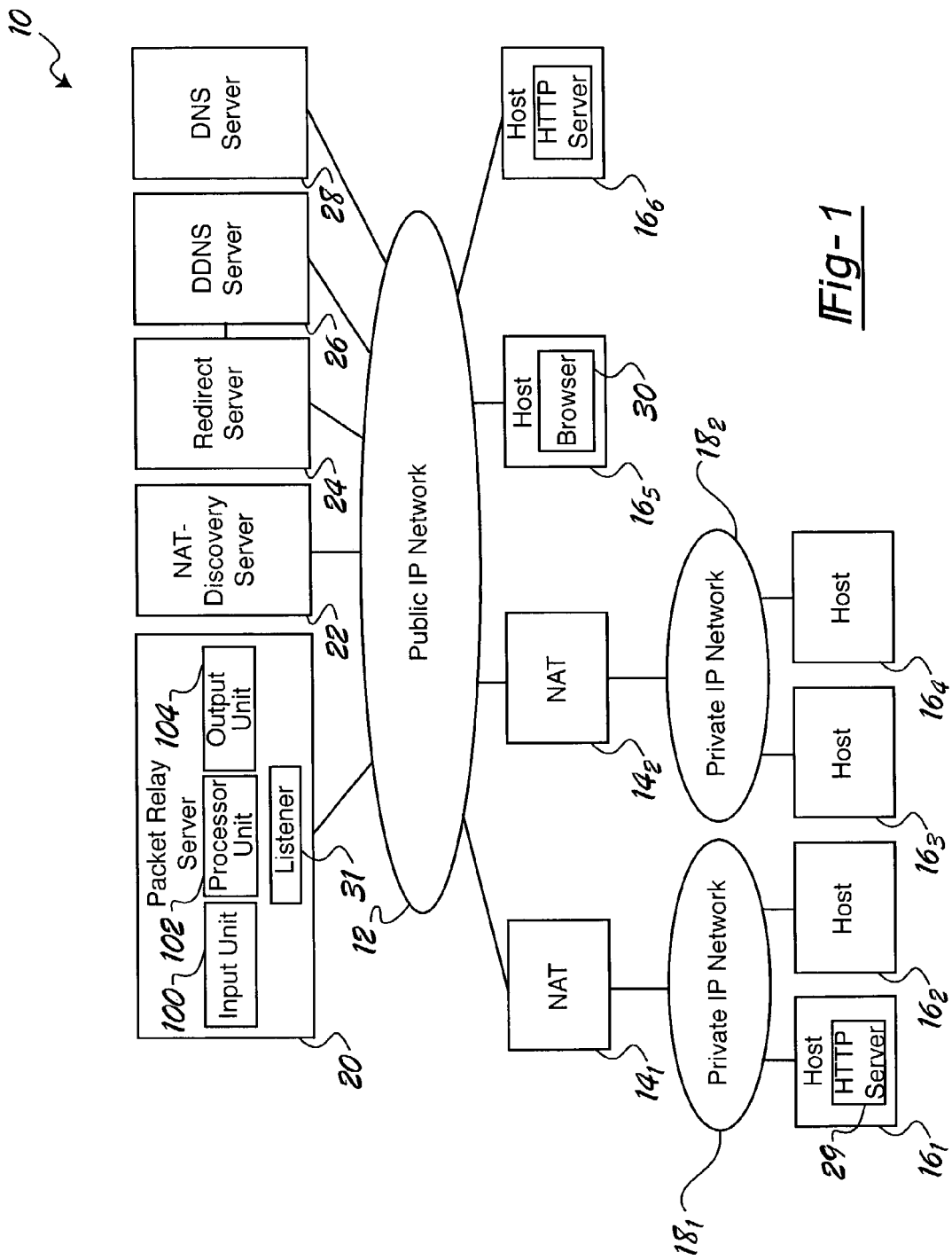
FIG. 1 shows a network configuration according to an embodiment of the present invention.

FIG. 1 shows a network configuration 10 according to an embodiment of the present invention. Network configuration 10 includes a public IP network 12 that can be, e.g., the Internet.

Included as being attached to the public network 12 are: a packet relay server 20, a NAT-discovery, e.g., STUN (Simple Traversal UDP (User Datagram Protocol) through NATs), server 22, a redirect server 24, a dynamic DNS (DDNS) server 26, a DNS (domain name system) server 26, a host computing device 165, a host computing device $16_6$, a network address translator (NAT) $14_1$ and a NAT $14_2$. The redirect server 24 and the DDNS server 26 also have a direct connection independent of the public IP network 12, e.g., representing a shared database (not depicted in FIG. 1).

The network configuration 10 further includes a private network $18_1$ and a private network $18_2$. host computing devices $16_1$ and $16_2$ connect to the network $18_1$ while host computing devices $16_3$ and $16_4$ connect to the network $18_2$.

For the purposes of subsequent discussion, it can be helpful to think in terms of examples in which there is: an application, e.g., a web browser 30, that runs on the host $16_5$; an application, e.g., an HTTP server 29, that runs on the host $16_1$; an input unit 100, a processing unit 102 and an output unit 104 in the relay server 20; an application, e.g., a listener 31, that runs on the packet relay server 20; and an application, e.g., an HTTP server 80, that runs on the host $16_6$.

Hosts $16_1$ and $16_2$ are indirectly connected to the public network 12 via the NAT $14_1$ and the private IP network $18_1$. Similarly, NAT $14_2$ indirectly connects the hosts $16_3$ and $16_4$ to the public IP network 12 via the private IP network $18_2$. hosts $16_5$ and $16_6$ are directly connected to the public IP network 12.

Network configuration 10 described above including the hosts, NATs and private IP networks is a non-limiting example of how the network configuration 10 can be implemented in an embodiment of the present invention. Those skilled in the art will appreciate that any combination of NATs, private IP networks, hosts and directly connected hosts can be included in the network configuration 10. The difficulty of using a host shielded by a NAT is described next in the context of an illustration.

Host $16_1$ can exchange IP packets with the public IP network 12 through the NAT $14_1$. The function of the NAT $14_1$ is to allow hosts $16_1$ and $16_2$ to share a single public IP address. The NAT $14_1$ assigns private addresses to the hosts $16_1$ and $16_2$. Such private addresses are not visible to other IP devices connected to the public network 12. For example, the directly connected host $16_5$ cannot readily send a packet addressed to the private address of host $16_2$ that was assigned by the NAT $14_1$.

NAT $14_1$ assigns private IP addresses to the hosts $16_1$ and $16_2$ that are located "behind" it, i.e., the hosts $16_1$ and $16_2$ share the public or global IP address assigned to the NAT $14_1$ plus each has (typically) a separate port number on the NAT $14_1$. The combination of an IP address and a port number is referred to as a transport address. In order to send packets to the host $16_1$, the browser 30 on the host $16_5$ can send the packets to the global IP address of the NAT $14_1$ and the port number assigned to the host $16_5$ if the browser 30 knows this information . Then, the NAT $14_1$ in turn forward the packets to the private address of the host $16_2$. But, as a practical matter, the presence of NAT $14_1$ will not allow a typical client, e.g., the browser 30, to directly access the HTTP server 29 on host $16_1$, since the browser 30 is most unlikely to have the port number of host $16_1$ that was assigned by the NAT $16_1$. This problem is known as the NAT traversal problem. To perform a NAT traversal, network configuration 10 according to an embodiment of the present invention includes additional elements as described next.

After booting up, the HTTP server 29 running on the host $16_1$ performs a NAT-discovery process, e.g., a STUN test, to find out if its host $16_1$ is located behind a NAT. In the example of a STUN test, the host $16_1$ attempts to initiate a STUN session with the STUN server 22. Again, in the present example, the host $16_1$ is located behind, i.e., shielded by NAT $14_1$. Hence, the STUN test session initiated by the host $16_1$ will indicate that the NAT $14_1$ is present in the connection between the host $16_1$ and the STUN server 22.

After positively determining the presence of a NAT, the host $16_1$ connects to the packet relay server 20, which is operable to receive and forward IP packets. host $16_1$ initiates a TCP (Transmission Control Protocol) session and sends a packet relay initiation request to the input unit 100 of the relay server 20. Phraseology that has been used to describe this arrangement is that, in response, the processing unit 102 of the relay server 20 can run a TCP application known as a listener 31.

It is noted that the relay server 20 is similar in some respects to an HTTP proxy server (not depicted) and an SIP type of TURN server (not depicted). An HTTP proxy server analyzes packet payload to determine whether progress of a packet beyond the proxy server should be blocked or facilitated. In contrast, the relay server 20 ignores the content of the packet, i.e., the relay server 20 does not block packet progress based upon the type of payload. The TURN protocol run by the TURN server, in contrast, generally supports a device (e.g., host $16_1$) behind a NAT (e.g., $14_1$), but specifically does not support the hosting of a server (e.g., HTTP server 29) by the host $16_1$.

The output unit 104 of the relay server 20 returns to the host $16_1$ a global IP address (namely, the IP address of the packet relay server 20) and a port on which it (namely, the packet relay server 20 running the listener 31) will receive and send packets on behalf of the host $16_1$. As is known, the packet relay server 20 assigns the address and port to the listener 31 dynamically. As such, the changing IP address and port must be tracked, as will be discussed below.

Hosts connected to the public IP network 12 such as the Internet can send packets to the IP address and port number designated by the relay server 20 as the listener 31. The listener 31 in turn forwards such packets to the host $16_1$ (by extracting the payloads from the packets it receives, rewrapping with a new header identifying the HTTP server 29 as the destination and forwarding the rewrapped payloads via the NAT $14_1$ to the HTTP server 29). Similarly, the host $16_1$ can send packets to the relay server 20, and the relay server 20 can rewrap the payloads and transmit them to the specific forwarding IP address given in the packets. The relay server 20 provides a mechanism for the host $16_1$ to indirectly obtain a global IP address (namely, an address on the public network 12) over which it can send and receive packets to/from the public network 12.

After obtaining the set of global IP address and port number from the relay server 20, the host $16_1$ via the NAT $14_1$ provides the redirect server 24 with the IP address and port number of the listener 31. Then the listener 31 can redirect HTTP requests from the public IP network 12 seeking the HTTP server 29 to the global IP address and port number of the listener 31 on the relay server 20.

Using the packet relay server 20, the host $16_1$ can send and receive packets as if it was directly connected to the public network 12, as described above. However, any user/client of the HTTP server 30 connected to the public IP network 12 such as the browser 30 will need a mechanism to connect to the HTTP server 29 on host $16_1$ via the packet relay server 20. The HTTP server 29 on host $16_1$ is assigned a FODN (again, a type of Universal Resource Locator (URL)), e.g., for the purposes of discussion say "www.somenet.com," which is statically associated with a global IP address on the redirect server 24. The redirect server 24 adaptively maps the FQDN www.somenet.com to the dynamic IP address and port number of the listener 31. Hence, when a user (not depicted) makes a request via the browser 30 to access the FQDN "www.somenet.com", the request from the browser 30 will first be received by the redirect server 24. The redirect server 24 can use multiple methods to redirect the HTTP request to the listener 31 on the relay server 20. Some examples of redirecting methods are described next.

The redirect server 24 can redirect an HTTP request by providing a "splash page" (not depicted) to the browser 30 when a request to access the host $16_1$ is made. A hyperlink can be provided on such a "splash page", which (if clicked by the user) will transfer the user to the listener 34 on the relay server 20. This further involves the user after the initial HTTP request had been submitted. Alternatively, the redirect server 24 can automatically redirect the HTTP request to the TCP listener 34 on the relay server 20 using the "307 Temporary Redirect" feature of the HTTP 1.1 protocol. The HTTP 1.1 temporary redirect method can eliminate the need to show a splash page and elicit a hyperlink click from the user of the browser 30. Further, a combination of splash page with an automatic JAVA-script-based redirect method can also be used. Via any of the above methods, the redirect server 24 can transfer or redirect any HTTP request for the HTTP server 30 on the host $16_1$ to the TCP listener 31 on the relay server 20.

Figure 2:
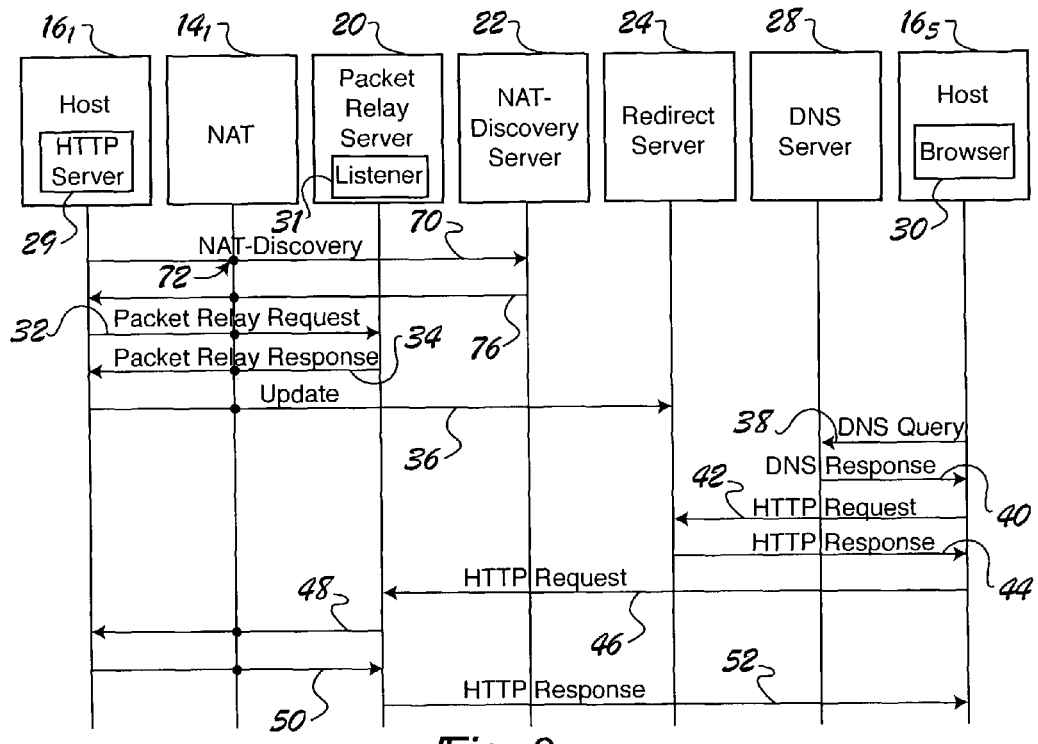
FIG. 2 is a sequence diagram of operations according to an embodiment of the present invention.

FIG. 2 is a sequence diagram of operations according to an embodiment of the present invention. FIG. 2 does not strictly conform to the conventions of UML-type sequence diagrams. After booting-up, the HTTP server 29 running on the host $16_1$ sends a message 70 initiating a NAT-discovery process, e.g., a STUN test. The message 70 is sent to the NAT-discovery server, e.g., STUN server 22, via the NAT $14_1$. The intervening role of the NAT $14_1$ is indicated by the dot 72 at the intersection of the message 70 and the lifeline 74 of the NAT $14_1$. Such a dot convention will be used for other messages passing via the NAT $14_1$. The NAT-discovery server 22 sends a return message 76 to indicate the presence of the NAT $14_1$ to the host $16_1$.

Host $16_1$ sends a message 32 to the packet relay server 20 requesting it to open a listener 31. The packet relay server 20 sends back a message 34 to the host $16_1$ indicating the global IP address (of the packet relay server 20) and the port number (on the packet relay server 20) assigned to the listener 31. The host $16_1$ then updates the redirect server 24 by a message 36 to register the global IP address and port number of the listener 31 on the relay server 20. The redirect server 24 will authenticate the message 36 and update its database to associate the IP address and port number of the listener 31 with the FQDN (here, in the example, www.somenet.com) of the HTTP server 29. After the above initiation process is over, the user can access the, e.g., of the browser 30 on the host $16_5$, HTTP server 29 running on the host $16_1$.

Harkening back to the example, it is to be noted that the browser 30 on the host $16_5$ is representative of any computer or IP-enabled device connected to the public IP network 12 (shown in FIG. 1). When the user of the browser 30 types in the URL (Universal Resource Locator), e.g., FQDN, of the HTTP server 29, the browser 31 on the host $16_5$ sends a message 38 to the DNS server 28 with the FQDN in order to obtain the DNS entry of the entered URL. The DNS server 28 sends back a message 40 to the host $16_5$ with the IP address of the redirect server 24. It may be necessary for the DNS server 28 to communicate (not shown as a message in FIG. 2) with the DDNS server 26 in order to collectively provide the IP address of the redirect server 24 to the browser 30.

The typical browser 30 on the host $16_5$ can then initiate an HTTP request to the IP address of the redirect server 24 on the default port 80 (for HTTP protocol communications) via a message 42. The redirect server 24 in turn checks its database to find a set of IP address and port number of the listener 31 on the relay server 20 that correspond to the requested URL or URI (Universal Resource Indicator). In other words, the redirect server 24 maintains a mapping to port numbers on the relay server 20, whereas the DNS 28/DNS 26 maintains merely the IP address of the listener 31/relay server 20. Upon finding a match, the redirect server 24, as shown by a message 44, responds by redirecting the HTTP request of the browser 30 to the relay server 20 using any of the above-described redirection methods.

Host 16₅ (as part of hosting the browser 30) then sends an HTTP request to the relay server 20 as indicated by the message 46 based on the redirection IP address and port number received from the redirect server 24. The relay server 20 in turn sends a message 48 to the host 16₁ with which it has maintained a live TCP session. Again, the relay server 20 unwraps the payloads of the packets (not shown) it receives that are directed to the listener 31, re-wraps the payloads to indicate the global IP address of the NAT 14₁ (which is also the global IP address of the HTTP server 29) and the port on the NAT 14₁ assigned to the HTTP server 29, and forwards the re-wrapped packets to the HTTP server 29 (via the NAT 14₁).

On the return side, the host 16₁ (as part of hosting the HTTP server 29) will send a response to the packet relay server 20 as message 50. Further, the relay server 20 transmits the response to the browser 30 on the host 16₅. In more detail, the relay server 20 receives packets sent by the HTTP server 29 whose destination is the browser 30, similarly rewraps the payloads as packets for the browser 30, and sends the re-wrapped packets to the browser 30. Thus, an HTTP session is established where the browser 30 on the host 16₅ can access the HTTP server 29 on the host 16₁ even though the host 16₁ is located behind. the NAT 14₁, i.e., even though the NAT 14₁ is located between the browser 30 and the HTTP server 29.

Such NAT traversal is achieved above without the browser 30 on the host 16₅ having knowledge of the private IP address of the HTTP server 29 shielded by the NAT 14₁. No manual step or configuration is required at the host 16₅, i.e., on the user side of the HTTP access operation. Such transparent NAT traversal can be important if the accessing device is a device, i.e., such as an IP phone, since it would be difficult for a user to manually configure the whole process of NAT traversal. Again, such difficulty is due to the majority of users of such devices, similar to the majority of browser users, not understanding the mapping of a domain name to a URL, much less the aspect of needing to designate a port as well as an IP address.

Figure 3:
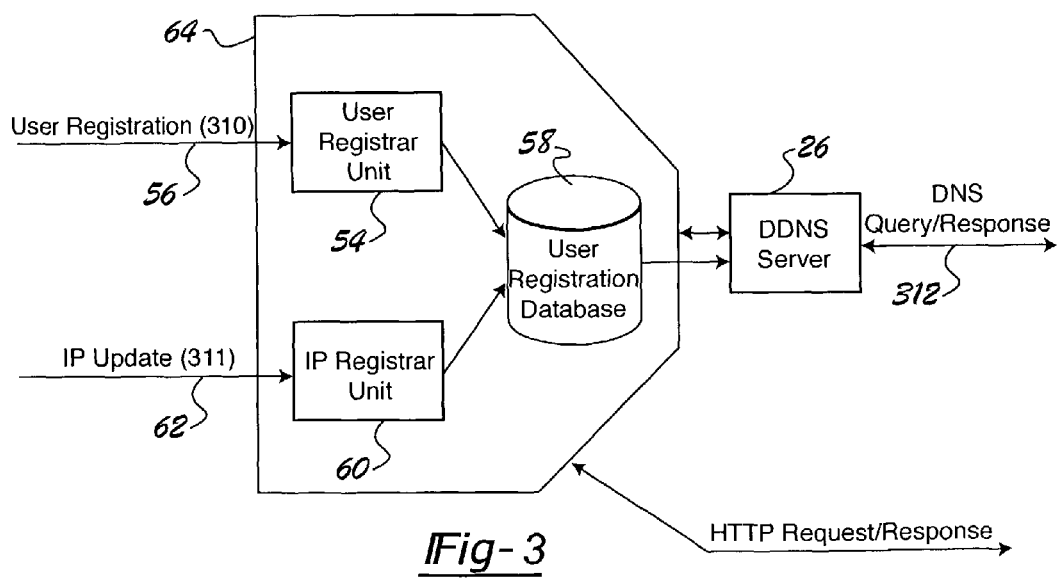
FIG. 3 is an association diagram between a Dynamic DNS (DDNS) and a redirect Server according to an embodiment of the present invention.

FIG. 3 is an association diagram between the Dynamic DNS (DDNS) server 26 and a redirect Server 64 according to an embodiment of the present invention. The redirect server 64 is similar to the redirect server 26 of FIG. 1. The redirect server 64 includes: a user registrar unit 54; a user registration database 58; and an IP registrar unit 60. In a given network configuration 10 (see FIG. 1), it is possible that the HTTP server is not located behind a NAT. For example, host 16₆ is not located behind a NAT. Further, a DDNS server 26 can be present that assigns a dynamic IP address and port number to the host 16₅.

Alternatively, the unit 54, the unit 60 and the database 58 can be hosted by a processing entity other than the redirect server 64. For example, the DDNS server 26 can host the database 58.

Internet Service Providers typically provide dial-up users with a non-static IP address that changes from time to time as users login and logout. IP addresses also change for other known reasons, e.g., expiration of a finite lifetime. The DDNS is used to overcome the problem of a changing IP address. DDNS allows a domain name to be associated with a changing, i.e., dynamic, IP address. DDNS takes care of directing the DNS to point to the currently updated dynamic IP address for a given domain name.

Where a given network configuration 10 includes a host (e.g., 16₆) that is not behind a NAT, the HTTP server (e.g., 80) on the host can initiate a NAT-discovery process and will determine that no NAT is present in its connection path. The HTTP host 80 thereafter updates the redirect server 64 with its own dynamic IP address. In case the DDNS server 26 is present in the system, then the step of updating the redirect server 64 can be eliminated, since the DNS server 28 will be able to resolve the dynamic IP address when a DNS query (e.g., message 38 in FIG. 2) is received. A mechanism to make the NAT traversal work seamlessly in situations where a NAT may or may not be present for a given host is described next.

Seamless network operation, either where no NAT is present in a DDNS environment or a NAT is present and there also is both a relay server 20 and a redirect server 64 (that receives/provides an HTTP request/response as represented by a double-headed arrow 313, which corresponds to the messages 42 and 44 in FIG. 2), can be made possible as described next. A user registrar 54 accepts online registration requests 310 from IP devices, for example, hosts running HTTP servers. User registrar 54 receives a message 56 from a user (not depicted) that includes a registration request 310 and updates a user registration database 58. Then, an IP registrar 60 receives a message 62 that includes an IP update 62. If the IP registrar 60 is able to authenticate the IP update 311 of message 62, then it updates the IP address and port number associated with the registered user in the user registration database 58 and also information about the presence of the NAT.

The DDNS server 26 continuously tracks changes to the user registration database 58. As soon as the DDNS server 26 detects any change to the user registration database 58, it finds out about the presence of NAT for the recent update. If a NAT is not present for the recently updated IP address and port number, then the DDNS server 26 updates its internal DDNS lookup table(s) with the updated IP address and port number. The DDNS lookup table(s) (not depicted) is searched by all DNS servers 28 for resolving DNS queries (represented by the double-headed arrow 312, which corresponds to the messages 38 and 40 in FIG. 2). If a NAT is present, then the DDNS server 26 registers the IP address of the redirect server 26 and port number. Hence, the user registration database 58 provides a seamless mechanism for both type of hosts, i.e., those that are behind NATs and those that are not behind (not depicted) NATs.

In case of a given host behind a NAT, the internal tables (not depicted) of the DDNS server 26 would supply the IP address and port number of the redirect server 64. For the other situation, where a given host is not behind an NAT, then the DDNS server 26 can simply supply the IP address and port number of the particular host in response to a DNS query, i.e., the redirect server would not be needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for communicating over a Network Address Translator (NAT) connected to an Internet Protocol (IP) network there being the system comprising:

a first host using HTTP protocol and residing in a private network, wherein the first host is connected via the NAT to the IP network and adapted to initiate a NAT-discovery process, and wherein the first host and a plurality of other hosts share a global IP address that is visible to hosts outside of the private network and wherein the first host has a private IP address assigned by the NAT that is unknown to hosts outside of the private network;

a second host using HTTP protocol and residing in the IP network that seeks to communicate with the first host;

at least one relay server connected to the IP network and in communication with the first host, wherein the relay server designates a listener having a redirection IP address and a port number, wherein the listener resides on the relay server and transmits packets from the second host to the first host, wherein the relay server dynamically assigns the redirection IP address and port number to the listener and the listener utilizes the redirection IP address and the port number to facilitate communication with the second host on behalf of the first host, and wherein the listener is created at a request of the first host; and at least one redirect server connected to the IP network and operable to redirect IP packets to the second host, the redirect server having a database storing the redirection IP address and port number of the relay server;

wherein the redirect server a) is statically associated with a plurality of locators representing a plurality of network entities and including a first locator representing the first host, b) receives requests from the second host targeting the first host, and c) maps the first locator to the redirection IP address of the relay server and the port number of the listener;

wherein the redirect server responds to a request from the second host targeting the first host with the redirection IP address and the port number of the listener on the relay server, wherein the response is transmitted to the second host;

wherein the second host is configured to send an HTTP request to the relay server based on the redirection IP address and port number received from the redirect server in response to a request for the first locator, wherein the relay server is configured to send a message from the second host to the first host via the listener designated for the first host, to receive a reply message from the first host via the listener, and to forward the reply message to the second host via the listener.

2. The system of claim 1, wherein:

the redirect server is operable to
  receive the access message from the second host, and
  redirect the access message to the listener operated by the relay server; and
the relay server is operable to relay the access message to the first host.

3. The system of claim 2, wherein the redirect server is operable to redirect the access message to the relay server using at least one of a splash page with a manual redirect, a splash page with an automatic redirect, a protocol based automatic redirect mechanism, and a splash page with a script-based automatic redirect.

4. The system of claim 1, wherein the relay server is operable, prior to receipt of the access request from the second host, to
  receive a packet relay request from the first host, and then
  provide the listener on behalf of the first host.

5. The system of claim 4, wherein the relay server is further operable to provide the first host with an IP address and a port number of the listener.

6. The system for claim 4, wherein
  the relay server is a packet relay server, and
  the listener is a Transmission Control Protocol (TCP) listener.

7. The system of claim 1, wherein the redirect server is operable to receive an update as to an IP address and a port number of the listener on the relay server corresponding to the first host.

8. The system of claim 7, wherein the update received by the redirect server comes from the first host.

9. The system of claim 1, wherein the relay server is operable to represent an HTTP server being hosted by the first host and the IP communication channel is a Hypertext Transfer Protocol (HTTP) type of connection.

10. The system of claim 1, wherein the IP network is the Internet.

11. A method for facilitating communication between a client connected to an IP network which includes the Internet and a first host connected via a Network Address Translator (NAT) to the IP network, wherein the first host and a plurality of other hosts share a redirection IP address that is visible to hosts outside of the network and wherein the first host has a private address assigned by the NAT that is unknown to hosts outside of the private network, the method comprising:

initiating a NAT discovery process by the first host;

receiving at a relay server connected to the IP network, if a NAT is detected in a communication path connecting the first host to the IP network as a result of the NAT discovery process, a packet relay request to generate a listener, the packet relay request originated by a source server utilizing Hypertext Transfer Protocol (HTTP) and being hosted on the first host;

providing a relay response from the relay server to the source server, the relay response indicating a redirection IP address of the relay server and a port number of the listener on the relay server; and receiving, at a redirect server, update information originated by the source server based upon the relay response, the update information including the redirection IP address of the relay server and the port number of the listener on the relay server;

wherein the redirect server and the relay server are each operative to cooperatively respond to an access request which targets the first host, wherein the redirect server is connected to the IP network and operable to redirect IP packets from the client to the first host via the listener on the relay server, the redirect server having a database storing the redirection IP address of the relay server and the port number of the listener on the relay server, wherein the client is configured to send an HTTP request to the relay server based on the redirection IP address and a port number received by the client from the redirect server, wherein the listener on the relay server is configured to send the HTTP request to the first host, to receive a reply message from the first host, and to forward the reply message to the client;

wherein the redirect server a) is statically associated with a plurality of locators representing a plurality of network entities and including a first locator representing the first host and b) receives requests from the IP network and targeting at the entities represented by the plurality of locators and c) maps the first locator to the redirection IP address and port number stored in the database;

wherein the redirect server responds to a request associated with the first locator with the redirection IP address and the port number of the relay server.

12. A method for facilitating communication between a client connected to the IP network and a first host residing in a private network and connected via a Network Address Translator (NAT) to the IP network and hosting an HTTP server, wherein the first host and a plurality of other hosts share a redirection IP address that is visible to hosts outside of the private network and wherein the first host has a private IP address assigned by the NAT that is unknown to the hosts outside of the private network, the method comprising:

initiating a NAT discovery process by the first host;

transmitting to a DNS server from a second host a query for an address of the first host;

receiving at the second host from the DNS server an IP address of a redirect server;

transmitting to the redirect server, an HTTP access request from the second host operating as an HTTP client of the HTTP server hosted on the first host;

receiving, by the second host, from the redirect server a redirection IP address of a relay server and a port number of a listener on the relay server forwarding, by the second host, the access request to the listener of the relay server using the IP address of the relay server and the port number of the listener on the relay server, which were received from the redirect server; and transferring the access request from the relay server to the first host;

the receiving, forwarding and transferring by the relay server and the redirect server collectively facilitating the establishment of an IP communication channel defining an HTTP connection between the first host and the second host wherein the redirect server a) is statically associated with a plurality of locators representing a plurality of network entities and including a first locator representing the first host, b) receives requests from the IP network and targeting at the entities represented by the plurality of locators, and c) includes a database storing the redirection IP address and port number of the relay server, wherein the redirect server responds to a request associated with the first locator with the redirection IP address of the relay server and the port number of the listener on the relay server, wherein the redirection IP address and the port number are designated to the first host.

13. The method of claim 12, wherein the establishment of the IP communication channel includes:

receiving an HTTP response from the HTTP server on the first host at the relay server; and transmitting the HTTP response from the relay server to the second host.

14. A method for facilitating communication from a client connected to the IP network to a host operable for hosting an HTTP server and connected via a Network Address Translator (NAT) to the IP network, wherein the host and a plurality of other hosts share a redirection IP address that is visible to hosts outside of the private network and wherein the host has a private IP address assigned by the NAT that is unknown to the hosts outside of the private network, the method comprising:

initiating a NAT discovery process by the host;

receiving a packet relay request at a relay server connected to the IP network, the request coming from the host connected via the NAT to the IP network; and providing a response from the relay server via the NAT to the host that indicates establishment of the listener on the relay server that will listen on behalf of the host for communication from the client to the host, wherein the response includes a redirection IP address of the relay server and a port number of the listener associated with the relay server, wherein the listener and the relay server are each operative to cooperatively respond to an access request which targets the host, wherein the client is configured to send an HTTP request to a redirect server, and receive the redirection IP address of the relay server and the port number associated with the listener via the redirect server, and to transmit the HTTP request to the listener associated with the relay server, wherein the relay server is configured to send a message received from the client to the host, to receive a reply message from the host, and to forward the reply message to the client;

wherein the redirect server a) is statically associated with a plurality of locators representing a plurality of network entities and including a first locator representing the host, b) receives requests from the IP network and targeting at the entities represented by the plurality of locators, and c) includes a database storing the redirection IP address and port number of the relay server, wherein the redirect server responds to a request associated with the first locator with the redirection IP address and the port number.

15. The method of claim 14, wherein the listener is a Transmission Control Protocol (TCP) listener.

16. The method of claim 14, wherein the IP network is the Internet.

17. A system comprising a packet relay server, connected to an Internet Protocol (IP) network, for facilitating communication from a client connected to the IP network to a host connected via a Network Address Translator (NAT) to the IP network, wherein the host and a plurality of other hosts share a redirection IP address that is visible to hosts outside of the private network and wherein the host has a private IP address assigned by the NAT that is unknown to the hosts outside of the private network, the packet relay server comprising:

an input unit to receive a packet relay request coming from the host connected via the NAT to the IP network, wherein the request is for the relay server to establish a listener on behalf of the host, the listener residing on the relay server and having a port number associated with a redirection IP address of the relay server; and a processor unit operable to generate the listener that will listen on behalf of the host for communication from the client to the host, and provide a response via the NAT to the host that indicates the IP address and port number of listener;

wherein said host executes an HTTP server application for which the listener is generated;

the system further comprising a redirect server, wherein the redirect server a) is statically associated with a plurality of locators representing a plurality of network entities and including a first locator representing the host and b) receives requests from the IP network and targeting at the entities represented by the plurality of locators and c) maps the first locator to the redirection IP address and port number stored in a database associated with the redirect server;

wherein the redirect server responds to a request associated with the first locator with the IP address and the port number of the listener, such that a request intended for the host by the client is directed to the redirect server, which redirects the request to the listener on the relay server by providing to the client the redirection IP address of the relay server and the port number of the listener associated with the relay server, wherein the client transmits the request to the listener on the relay server, which in turn forwards the request to the host.

18. The system of claim 17, wherein the listener is a Transmission Control Protocol (TCP) listener.

19. The system of claim 17, wherein the IP network is the Internet.

* * * * *